United States Patent [19]
Sato

[11] Patent Number: 4,940,993
[45] Date of Patent: Jul. 10, 1990

[54] IMAGE RECORDING APPARATUS

[75] Inventor: Yoshimitsu Sato, Kanagawa, Japan

[73] Assignee: Fuji Photo Film Co., Ltd., Kangagawa, Japan

[21] Appl. No.: 339,839

[22] Filed: Apr. 18, 1989

[30] Foreign Application Priority Data

Apr. 19, 1988 [JP] Japan .................................. 63-96135
Apr. 19, 1988 [JP] Japan .................................. 63-96136
Apr. 19, 1988 [JP] Japan .................................. 63-96137

[51] Int. Cl.$^5$ ............................................. G01D 15/10
[52] U.S. Cl. .............................. 346/76 PH; 346/76 R
[58] Field of Search ......................... 346/76 R, 76 PH; 428/203, 207, 488.4; 503/200, 204

[56] References Cited

U.S. PATENT DOCUMENTS 4,811,036 3/1989 Gaskill et al. .................. 346/76 PH

FOREIGN PATENT DOCUMENTS 49-114431 10/1974 Japan .
50-3640 1/1975 Japan .
4020151 9/1975 Japan .
60-4092 1/1985 Japan .
61-227086 10/1986 Japan .
62-44492 2/1987 Japan .
63-45084 2/1988 Japan .
63-252783 10/1988 Japan .

*Primary Examiner*—George H. Miller, Jr.
*Assistant Examiner*—Gerald E. Preston
*Attorney, Agent, or Firm*—Sughrue, Mion, Zinn, MacPeak & Seas

[57] ABSTRACT

An image recording apparatus for recording an image on a heat-sensitive recording material composed of a transparent carrier and transparent heat-sensitive coupler layers formed on the opposite surfaces of the transparent carrier is provided with a feeding device for feeding the heat-sensitive recording material rectilinearily and a recording head for developing, by heating, the colors of the respective transparent heat-sensitive coupler layers of the heat-sensitive recording material which is being fed. Accrodingly, it is possible to heat the transparent heat-sensitive coupler layers consistently in a plate state.

19 Claims, 13 Drawing Sheets

IMAGE RECORDING APPARATUS

BACKGROUND OF THE INVENTION

1. Field of the Invention

The present invention relates to an image recording apparatus for recording an image on a heat-sensitive recording material which is composed of a transparent carrier and a plurality of transparent heat-sensitive coupler layers deposited on the opposite surfaces of the transparent carrier. The transparent heat-sensitive coupler layers are each designed to produce a color having a different hue.

2. Description of the Related Art

Heat-sensitive recording systems are currently well known as one type of system for recording an image on recording paper by means of a heat-generating unit. Such a heat-sensitive recording system commonly employs a heat-sensitive recording material which is comprised by a carrier, such as ordinary paper or synthetic paper, coated with a coupler and a color developer. The heat-sensitive recording system is arranged to effect image recording by utilizing the process of heating the heat-sensitive recording material by means of a thermal head. This type of heat-sensitive recording method has the following advantages:

1. No development is needed.

2. The texture and quality of a carrier made of paper are close to those of ordinary paper.

3. The system is easy to handle.

4. Color density is high.

5. The recording apparatus is of a simple structure and is inexpensive.

6. The noise level of the system during recording operation is low compared to that of a dot printer or the like.

In recent years, heat-sensitive recording systems having the above-described advantages have rapidly been accepted in the field of monochromatic facsimile machines, printers and the like.

Moreover, in the field of information recording, the easy obtainment of a color hard copy from the terminal of information processing equipment such as a computer, a facsimile machine, or the like has been strongly desired. However, in order to obtain multi-color heat-sensitive recording materials, it is necessary that color forming mechanisms which are equivalent in number to the colors to be developed be provided on one carrier. The individual color-forming mechanisms must then be worked in a separately controlled manner. A large amount of effort has been directed toward the realization of such a multi-color heat-sensitive recording system, but no system has been proposed which achieves the adequate representation of the color hues and the satisfactory separation of colors.

As described above, an opaque carrier such as ordinary paper or synthetic paper is commonly applied to the carrier of the heat-sensitive recording material. This is simply because a color image is usually read in the form of an image reflected from one surface of the recording material.

Examples using transparent matter as carriers of heat-sensitive recording materials are disclosed in Japanese Patent Publication No. 20151/1965, Japanese Patent Application Nos. 68875/1985 and 184483/1985. The object common to these prior inventions is to enable a high-contrast image or a high-quality image of superior gloss to be obtained when a thermally recorded image is viewed from the direction of the transparent carrier. Moreover, another invention is proposed in which heat-sensitive recording layers each having a different color hue are deposited on the opposite surfaces of a transparent carrier, in order to obtain a color image of two or more colors (refer to Japanese Patent Laid-open Nos. 114431/1974, 3640/1975 and 4092/1975).

In accordance with these proposals, however, coupler components and color development components are merely dispersed in a solid state in the heat-sensitive coupler layers. The coupler layers therefore become substantially opaque due to the scattering of light. Accordingly, it is impossible to obtain the desired multi-color image composed of clearly separated colors. In accordance with the invention disclosed in Japanese Patent Laid-open No. 4092/1975, it is suggested that individual components be molten and applied as one layer in order to improve the transparency of a heat-sensitive coupler layer. In this case, however, since each component tends to easily produce its color prior to printing, a so-called fog may appear. For this reason, the possible number of steps of color separation is limited and, therefore, this multi-color recording material is still substantially insufficient.

To overcome the above-described problems, the applicant proposed a multi-color heat-sensitive recording material composed of a transparent carrier and coupler layers formed on the opposite surfaces of the transparent carrier. The coupler layers were substantially transparent and capable of producing colors each having a different hue. With this multi-color heat-sensitive recording material, it is possible to provide a thermal color image whose quality improves on those of conventional thermal color images (Japanese Patent Application Nos. 80787/1076, 88196/1977, and 75409/1977).

With this multi-color heat-sensitive recording material, it is possible to obtain a multi-color image having excellent hues superior color separation characteristics and improved storage life. Heretofore, these 3 aspects have never been achieved by a heat-sensitive recording system. In addition, it is possible to convert the obtained image into a transmitted image or a reflected image.

Since this type of heat-sensitive recording paper has opposite surfaces coated with coupler layers, it is necessary to heat both surfaces by means of one or more thermal heads. In the case of heat-sensitive recording paper having opposite surfaces either of which is coated with multiple coupler layers, it is necessary that the uppermost layer (the layer nearest to the surface) be colored by the application of heat having an intensity such that the other layers are not heated. After the colored layer has been fixed, the other layers need to be heat treated.

The basic procedure for recording an image on heat-sensitive recording paper will be explained below with reference to FIGS. 11(A) to 11(E). As shown in FIG. 11, a heat-sensitive recording material 10 includes a carrier which is a polyester film (hereafter referred to as "PET") 125, on which a magenta dye layer (hereinafter referred to as "M-dye layer") 126 is formed on one surface. On the M-dye layer 126, a yellow dye layer (hereinafter referred to as the "Y-dye layer") 128 is formed. On the other surface of the carrier is formed a cyan dye layer (hereinafter referred to as the "C-dye layer") 130. This heat-sensitive recording material 10 is transparent at room temperature. The Y-dye layer 128 is of the light fixing type which does not undergo any variation during heating after it has been irrdiated with light rays of wavelength 400 nm from a light source 131. A recording head 133 is disposed on the upper side of the heat-sensitive recording material 10 as viewed in, for example, FIG. 11(A).

Referring to FIG. 11(A), the Y-dye layer 128 is heat treated by means of a recording head 133. In this heating step, the intensity of heat is selected so as not to develop the color of the M-dye layer 126 underlying the Y-dye layer 128. Accordingly, the color of the Y-dye layer 128 alone is developed.

Referring next to FIG. 11(B), the Y-dye layer 128 is irradiated with light rays with a wavelength of approximately 400 nm, thereby fixing the Y-dye layer 128 so that the color thereof does not undergo any variation during subsequent heating.

Referring to FIG. 11(C), the M-dye layer 126 is heated at an intensity which is greater than that of the heat applied to the Y-dye layer 128. Thus, the color of the M-dye layer 126 is developed.

Referring next to FIG. 11(D), the heat-sensitive recording material 10 is turned upside down and, as shown in FIG. 11(E), the C-dye layer 130 is heated.

If another recording head 135 is disposed on the underside of the heat-sensitive recording material 10 (as shown by phantom lines in FIG. 11(A)), the C-dye layer 130 is heated without turning the recording material 10 upside down. In this case, the color of the C-dye layer 130 is developed by applying heat thereto at such an intensity that it does not affect the M-dye layer 126 formed on the side of the PET 125 opposite the C-dye layer 130.

However, no image recording apparatus capable of automatically effecting this image recording procedure has currently been developed. In order to realize an image recording apparatus for recording an image on a multi-color heat-sensitive recording material, the following requirement must be satisfied: the heat-sensitive recording material must be able to be accurately positioned so that one image can be recorded in steps the number of which is the same as the number of color layers to reproduce the color of the image. However, as long as this positioning step is not automated, it is difficult to ensure high-speed processing which is comparable to the processing speeds of conventional apparatus.

SUMMARY OF THE INVENTION

It is, therefore, an object of the present invention to provide an image recording apparatus capable of automatically heating each of the coupler layers formed on the opposite surfaces of a transparent carrier and having practicability such as high-speed processability.

To achieve the above and other objects, in accordance with the present invention, there is provided an image recording apparatus for recording an image on a heat-sensitive recording material composed of a transparent carrier and transparent heat-sensitive coupler layers formed on opposite surfaces of the transparent carrier, respectively, and is capable of developing colors each having a different hue. A plurality of transparent heat-sensitive coupler layers are desposited on at least one of the opposite surfaces. This image recording apparatus is provided with a feeding means for feeding the heat-sensitive recording material rectilinearily, a recording head for producing, by heating, the colors of the respective transparent heat-sensitive coupler layers of the heat-sensitive recording material fed by the feeding means, and an light fixing means for fixing, by irradiation with light rays, the outermost transparent heat-sensitive coupler layer that produced its color from among the plurality of transparent heat-sensitive coupler layers.

In accordance with the present invention, the heat-sensitive recording material is moved rectilinearily by means of the feeding means to heat each transparent heat-sensitive coupler layer during the rectilinear movement, thereby developing a corresponding color.

As described above, since heating is effected consistently in a flat state, the position of the recording material does not deviate and it is therefore possible to produce each color at a predetermined position. Since high-speed processing can be effected, the present invention excels in practicability and it is also possible to effectively utilize a multi-color heat-sensitive recording material.

Regarding the side of the heat-sensitive recording material on which the plurality of transparent heat-sensitive coupler layers are deposited, after the layer that initially develops a color has been fixed by the light fixing means, the color of the next layer is produced. Accordingly, the processes of developing the colors of these two layers do not influence each other.

In addition, if the reversing means for turning the heat-sensitive recording material upside down is provided, the transparent heat-sensitive coupler layers on the opposite side of the recording material can be heated. The number of recording heads can thus be reduced to one and the number of parts can be decreased correspondingly.

DESCRIPTION OF THE PREFERRED EMBODIMENTS

Figure 1:
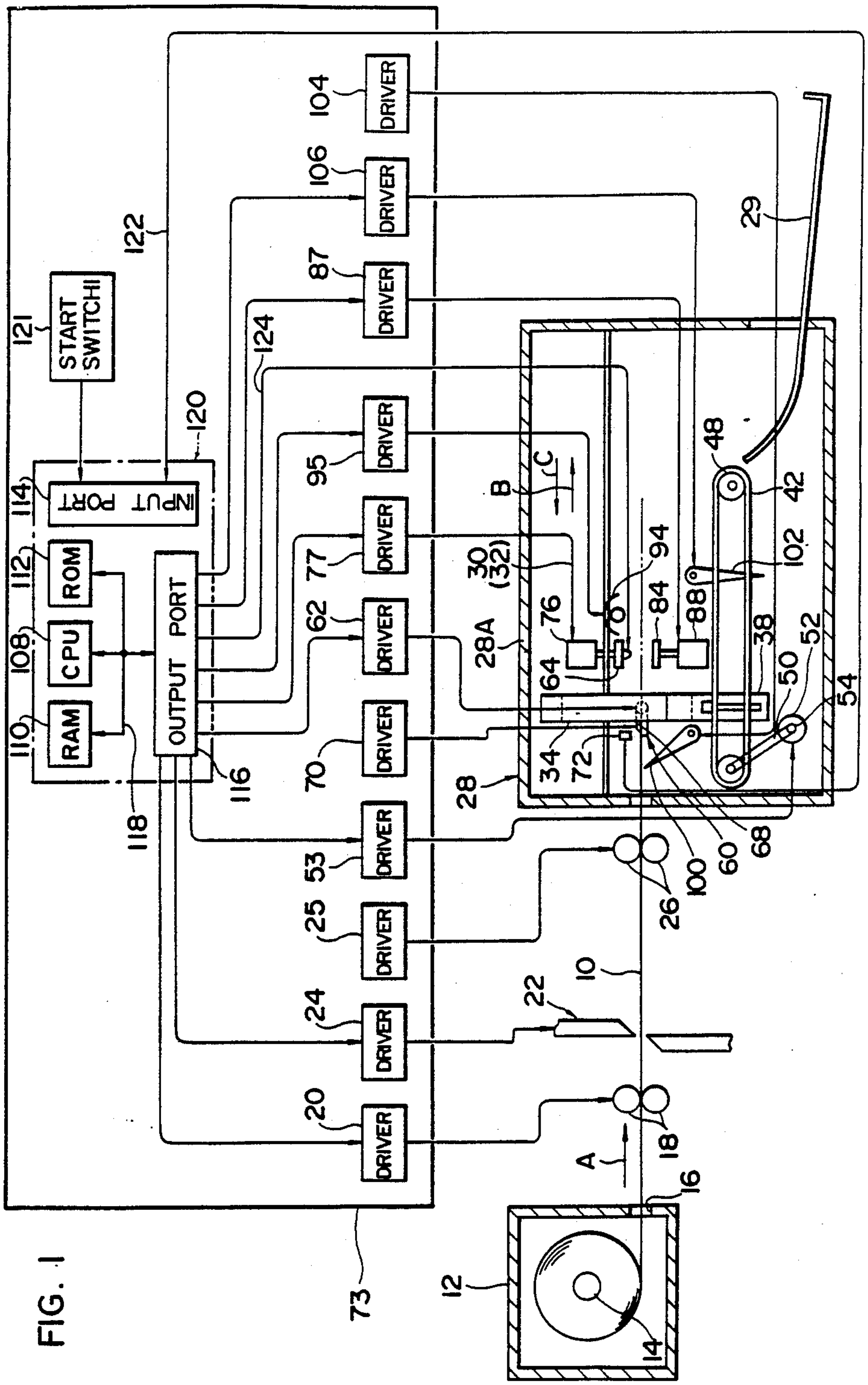
FIG. 1 is a block diagram diagrammatically showing the construction of a first embodiment of an image recording apparatus according to the present invention.

FIG. 1 diagrammatically shows the structure of a first embodiment of an image recording apparatus according to the present invention.

One end of a heat-sensitive recording material 10 is accommodated in a magazine 12 and is wound around a take-up reel disposed in the magazine 12. An intermediate portion of the heat-sensitive recording material 10, which is drawn from the magazine 12 through a drawing port 16, is held between feed rollers 18. The feed roller 18 is rotated by the driving force of a driver 20 so as to feed the heat-sensitive recording material 10 in the direction indicated by arrow A in FIG. 1.

Figure 11A:
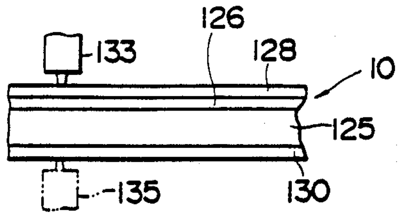
FIGS. 11(A) to 11(E) are charts which serve to illustrate the process of producing the color of the multi-color heat-sensitive recording material, which can be applied to the present invention.
Figure 11B:
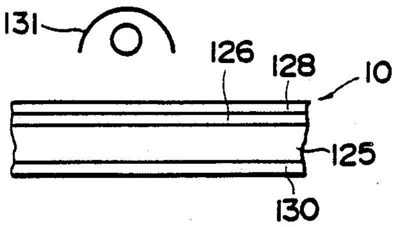
Figure 11C:
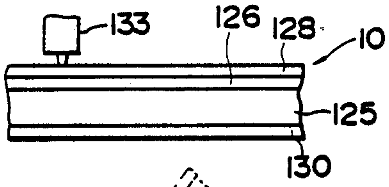
Figure 11D:
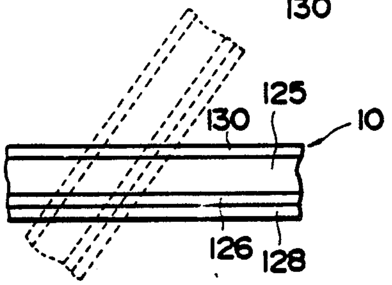
Figure 11E:
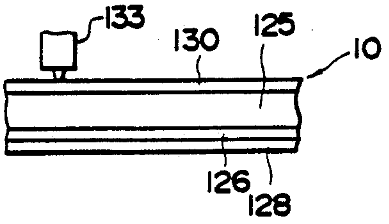

As explained in the description of the related art, the heat-sensitive recording material 10 has a structure in which one surface is coated with coupler layers 126 and 128 (M and Y) while the other surface is coated with a coupling layer 130 (C) (see FIG. 11(A)). In each embodiment which will be described later, the PET 125 is utilized as a carrier and the heat-sensitive recording material 10 is therefore transparent.

A cutter device 22, under the driving force of a driver 24, is disposed downstream from the feed rollers 18 so as to cut the heat-sensitive recording material 10 into portions each having a predetermined length. The cut portion of the heat-sensitive recording material 10 is fed further while being held between feed rollers 26 and is then introduced into a heating section 28. In the heating section 28, each dye layer of the heat-sensitive recording material 10 is heated so that the recording of an image is effected, and is then discharged into an outlet tray 29 which is disposed downstream from the heating section 28.

Figure 2:
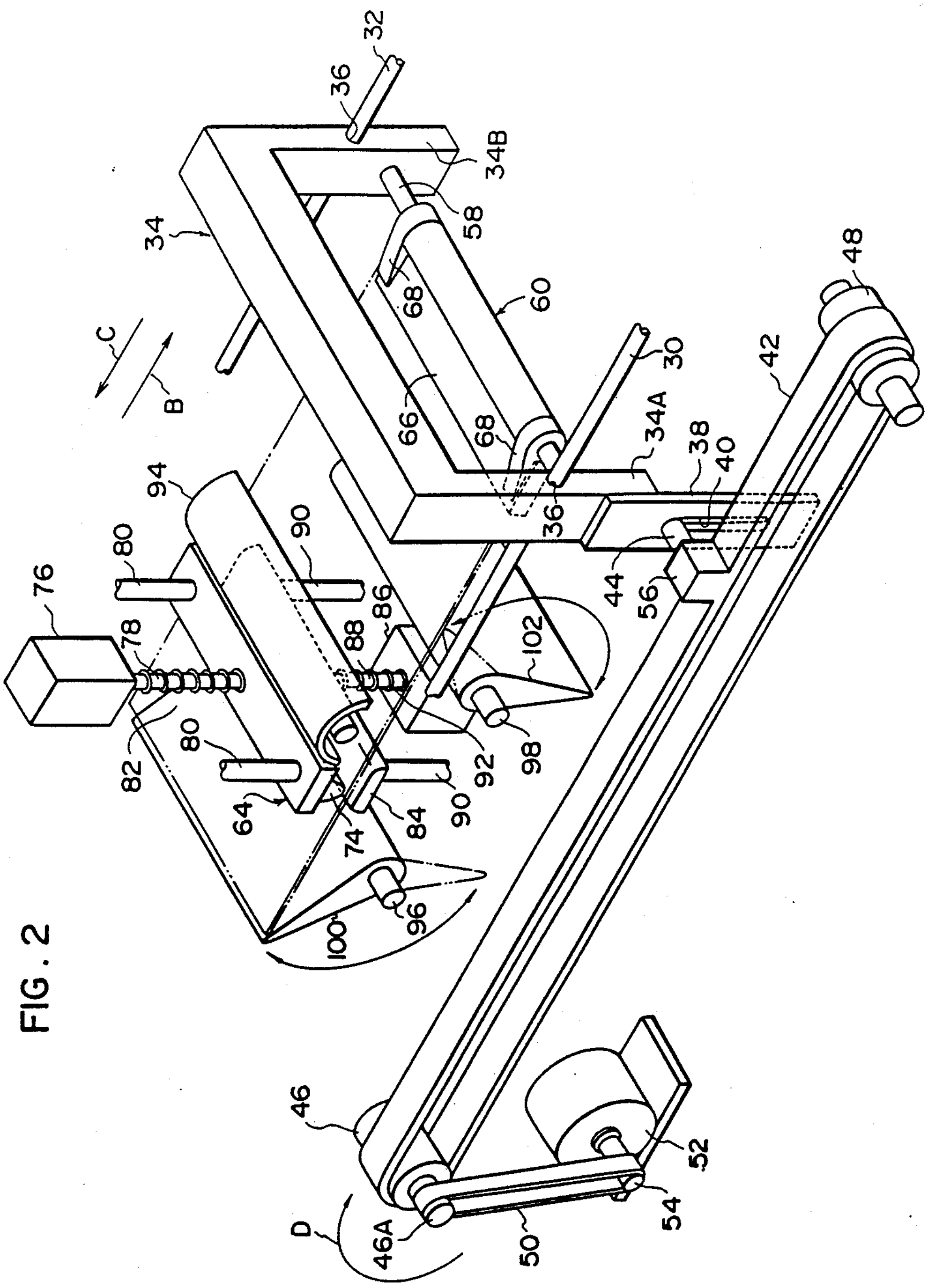
FIG. 2 is a diagrammatic perspective view showing the heating section used in the first embodiment.

A frame 28A of the heating section 28 is provided with guide bars 30 and 32 which extend in parallel with each other. A moving base 34 which constitutes a part of the moving means is disposed across the guide bars 30 and 32. As shown in FIG. 2, legs 34A and 34B, which are parallel to each other, are formed integrally with the moving base 34 at the respective longitudinal opposite ends thereof (the opposite ends in the direction perpendicular to the axes of the corresponding guide bars 30 and 32). Circular holes 36 are formed in the respective legs 34A and 34B, and the guide bars 30 and 32 are inserted through the circular holes 36, respectively. Thus, the moving base 34 is caused to move along the guide bard 30 and 32 in the direction indicated by arrow B or C of FIG. 2.

A coupling plate 38 is secured to the lower end of the leg 34A of the moving base 34 (the one placed on this side as viewed in FIG. 2). A slot 40 is formed in the coupling plate 38 and a moving shaft 44 which projects from a flat belt 42 is inserted through the slot 40. The flat belt 42, which constitutes the moving means in cooperation with the moving base 34, is passed around rollers 46 and 48 to form an endless-looped so that it can be moved by the rotation of the rollers 46 and 48. The roller 46 has a rotating shaft 46A which is coupled to a rotating shaft 54 of a motor 52 by a driving belt 50. Thus, the flat belt 42 is caused to rotate at a constant speed in the direction indicated by arrow D of FIG. 2 by the driving force of the motor 52. The motor 52 is connected though a driver 53 to a control device 73 which will be described later.

A projection 56 having a rectangular cross-sectional configuration is formed integrally on a portion of the flat belt 42. The aforementioned moving shaft 44 is fixed to the side surface of the projection 56 which opposes the coupling plate 38 so that the feeding force of the flat belt 42 can be transmitted to the coupling plate 38.

In this arrangement, if the projection 56 of the flat belt 42 is reversed from the upper side to the lower side as viewed in FIG. 2 by the rotation of the roller 48, the moving shaft 44 is caused to move from the upper end to the lower end of the slot 40. This action changes the direction of movement of the moving base 34 from the direction of arrow B to the direction of arrow C in FIG. 2. If the flat belt 42 is reversed at the roller 46, the moving shaft 44 is caused to move from the lower end to the upper end of the slot 40, thereby changing the direction of movement of the moving base 34 from the direction of arrow C to the direction of arrow B in FIG. 2. With this arrangement, it is possible to move the moving base 34 back and forth by means of the unidirectional rotation of the flat belt 42.

A holder section 60, which constitutes a reverse means for holding the heat-sensitive recording material 10 by means of a reversing shaft 58, is disposed between the legs 34A and 34B of the moving base 34. The reversing shaft 58 is capable of rotating back and forth over an angular range of 180 degrees by means of the driving force of a driver 62 (refer to FIG. 1). The reversing shaft 58 and the holder section 60 are fixed to each other so that the holder 60 can be rotated over an angular range of 180 degrees by means of the rotation of the reversing shaft 58.

More specifically, at the time that the direction of movement of the moving base 34 is changed from the direction of arrow B to the direction of arrow C in FIG. 2, the holder section 60 is caused to rotate 180 degrees from the state shown in FIG. 2 so that the holder section 60 is always located at the leading edge of the heat-sensitive recording material 10 which is being fed. Incidentally, in this first embodiment, when the projection 56 of the flat belt 42 is located in the vicinity of the roller 46, the holder section 60 holds the heat-sensitive recording material 10 and, while the moving base 34 is making one and a half round trips as the flat belt 42, moves in the direction of arrow D in FIG. 2. That is, while the moving base 34 is being driven, first in the direction of arrow B, second in the direction of arrow C and finally in the direction of arrow B as viewed in FIG. 2, the Y-dye layer 128, the C-dye layer 130 and the M-dye layer 126 are sequentially caused to develop their individual colors by means of a thermal head 64 which will be described later. Thus, the recording of one image is completed.

The holder section 60 is constructed of a base 66 for carrying the leading end of the heat-sensitive recording material 10 and a pair of claw members 68 for holding the opposite corners of that leading end. This serves to transport the heat-sensitive recording material 10 by pulling it. The claw members 68 can be rotated back and forth about the reversing shaft 58 by means of the driving force of a driver 70 (refer to FIG. 1). Accordingly, the holder section 60 can hold the heat-sensitive recording material 10 by shifting the claw members 68 down to the base 66 when the leading end of the heat-sensitive recording material 10 is carried on the base 66 with the claw members 68 separated from the base 66.

A sensor 72 for detecting the presence or absence of the heat-sensitive recording material 10 is disposed above the position of the holder section 60 which is shown in FIG. 1. When the holder section 60 reaches the position shown in FIG. 1, the sensor 72 detects whether or not the leading end of the heat-sensitive recording material 10 has been carried on the base 66, and then supplies a detection signal (a high-level signal when the heat-sensitive recording material 10 has been detected or a low-level signal when it has not been detected) to the control device 73 which will be described later. The control device 73 controls the timing at which the claw member 68 hold the heat-sensitive recording material 10.

The line-type thermal head 64, which serves as a recording head, is disposed at an intermediate location on the path of movement of the heat-sensitive recording material 10. The thermal head 64 is located above the path of movement as viewed in FIG. 2 and has a heat generating unit 74 for effecting image recording by heating the heat-sensitive recording material 10. The heat generating unit 74 is arranged so as to oppose the heat-sensitive recording material 10 which is sequentially fed by the movement of the holder section 60.

An actuator 78 of a solenoid 76 is connected to the top surface of the thermal head 64, and the actuator 78 is arranged to move back and forth in the axial direction in response to the energizing and de-energizing of the solenoid 76. A pair of guide shafts 80, which are parallel to each other, are connected to the portions of the top of the thermal head 64 which are adjacent to the longitudinal opposite ends. This prevents the thermal head 64 from rotating about the actuator 78. A compression coil spring 82 is fitted onto the actuator 78 so as to urge the actuator 78 in the direction in which it projects from the solenoid 76. Thus, during the de-energizing of the solenoid 76, the actuator 78 projects from the solenoid 76. During the energizing of the solenoid 76, the actuator 78 is held in a retracted state. Incidentally, the solenoid 76 is connected to the control device 73 through a driver 77.

A guide plate 84 is disposed in a face-to-face relationship with the thermal head 64 at a location below the feeding path of the heat-sensitive recording material 10 as viewed in FIG. 2. An actuator 88 of a solenoid 86 is connected to the bottom of the guide plate 84, and the actuator 88 is arranged to move back and forth in the axial direction in response to the energizing and deenergizing of the solenoid 86. A pair of guide shafts 90 which are parallel to each other are disposed to both the longitudinally adjacent side portions of the guide plate 84, so as to prevent the thermal head 64 from rotating about the actuator 88. A compression coil spring 92 is fit onto the actuator 88 so as to urge the actuator 88 in the direction in which it projects from the solenoid 86. Thus, during the de-energizing of the solenoid 86, the actuator 88 projects from the solenoid 86. On the other hand, during the energizing of the solenoid 86, the actuator 88 is held in a retracted state. The solenoid 86 is connected to the control device 73 through a driver 87.

The thermal head 64 and the guide plate 84 are spaced apart from each other during the energizing of the respective solenoids 76 and 86 so as not to interfere with the holder section 60 or the heat-sensitive recording material 10 while they are being moved. When the solenoids 76 and 86 are de-energized, the thermal head 64 and the guide plate 84 are moved toward each other so as to clamp the heat-sensitive recording material 10.

A light source 94 which constitutes s light fixing means is disposed downstream from the thermal head 64, and is connected to the control device 73 through a driver 95. The light source 94 is arranged to effect irradiation with light rays of a wavelength of 400 nm and serves to fix the uppermost Y-dye layer 128 of the heat-sensitive recording material 10 whose color is produced by heating during its initial feed in the direction of arrow B in FIG. 2. This action prevents any variation in the hue of the Y-dye layer 128 during subsequent heating. More specifically, during heating of the Y-dye layer 128, the intensity of heat generated by the heat generating unit 74 is regulated to such an extent that the second M-dye layer 126 is not affected (that is, the level "LOW" is selected). During the next feed in the direction of arrow B in FIG. 2, the level "HIGH" is selected to increase the intensity of heat generated by the heat generating unit 74 so that the M-dye layer 126 alone can be heated. After the heating of the M-dye layer 126, that is, after the heat-sensitive recording material 10 has turned one and a half rounds, while the holder section 60 is being reversed at the position of the roller 48, the heat-sensitive recording material 10 is disengaged from the claw sections 68 and travels toward the discharge tray 29 by virtue of its own weight.

Incidentally, the C-dye layer 130 formed on the reverse side of the heat-sensitive recording material 10 is heated during the return thereof after the movement in the direction of arrow B in FIG. 2 (that is, during the movement in the direction of arrow C in FIG. 2). The image signal obtained in this case is a signal which is reverse to the signal obtained during the movement in the direction of the arrow B in FIG. 2.

Arm plates 100 and 102 are respectively supported by rotating shafts 96 and 98 upstream and downstream of the guide plate 84. The arm plates 100 and 102 are arranged to support the trailing end of the heat-sensitive recording material 10 in an approximately straight form so that the trailing end does not curve during the feed of the heat-sensitive recording material 10. As the heat-sensitive recording material 10 is reversed, the arm plates 100 and 102 are rotated about their respective rotation shafts 96 and 98 by the driving force of drivers 104 and 106 so that neither of the arm plates 100 and 102 interferes with the trailing end of the heat-sensitive recording material 10.

The control device 73 (FIG. 1) is provided with a microcomputer 120 which consists of a CPU 108, a RAM 110, a ROM 112, an input port 114, an output port 116, and a bus 118 including a data bus, a control bus and the like. A start switch 121 is connected to the input port 114, and is actuated to initiate the operation of drawing the heat-sensitive recording material 10 from the magazine 12, thereby carrying out a sequence of heating steps. A signal line 122 which extends from the aforesaid sensor 72 is connected to the input port 114.

Connected to the output port 116 are each of the drivers described above and a signal line 124 for supplying the aforesaid image signal to the heat generating unit 74 of the thermal head 32.

The operation of the first embodiment will now be described with reference to the operation diagrams of FIGS. 3(A) to 3(D) and the control flow chart of FIG. 4.

First, in Step 150, the heat-sensitive recording material 10 is fed from the magazine 12 in the direction of arrow A of FIG. 1 and then cut by the operation of the cutter device 22. Thereafter, a predetermined amount of the cut portion of the heat-sensitive recording material 10 is fed between the feed rollers 26. In Step 152, if the sensor 72 (not shown) detects the fact that the leading end of the heat-sensitive recording material 10 has reached the base 66 of the holder section 60, the process proceeds to Step 156. In Step 156, the claw members 68 are actuated (from the state —① shown by a two-dot chain line to the state —② shown by a solid line in FIG. 3(A) so as to clamp the opposite corners of the leading end of the heat-sensitive recording material 10. This holds the leading end at a predetermined location on the base 66. In this case, the arm plate 100 supports an intermediate portion of the heat-sensitive recording material 10. In the next step 158, the motor 52 is started up. After the motor 52 has been started up, its driving force is transmitted to the roller 46 by the driving belt 50 to cause the flat belt 42 to move in the direction of arrow D of FIG. 2. The moving base 34 is moved in the direction of arrow B of FIG. 2 through the coupling plate 38 and the moving shaft 44 by the driving of the flat belt 42. When a predetermined time period has passed after the moving base 34 starts moving (Step 160), the process proceeds to Step 162, where the energizing of the solenoids 76 and 86 is cancelled. Thus, the actuators 78 and 88 are caused to project from the solenoids 76 and 78 by the urging force of the compression coil springs 82 and 92, respectively. This causes the heat generating unit 74 of the thermal head 64 to press against the upper surface of the heat-sensitive recording material 10. The guide plate 84 presses against the lower surface of the heat-sensitive recording material 10 (the state shown by solid lines in FIG. 3(B)).

In the following step 164, the intensity of heat to be generated by the heat generating unit 74 is set to the level "LOW". In Step 166, the light source 94 is switched on. In this state, the process proceeds to Step 168, where an image signal is supplied to the heat generating unit 74 and, while the moving base 34 is moving, an image is recorded which corresponds to the Y-dye layer 128 which constitutes the uppermost layer of the heat-sensitive recording material 10 (the process proceeds from the state —③ shown by the solid lines to the state —④ shown by two-dot chain lines in FIG. 3(B)). The Y-dye 128 which has the image recorded by the heat generating unit 74 is irradiated with the light rays of wavelength 400 nm emitted from the light source 94 disposed downstream from the heat generating unit 74, thereby effecting the fixation of the image. This step serves to prevent the hue of the image from undergoing any variation in the subsequent heating process.

Figure 3:
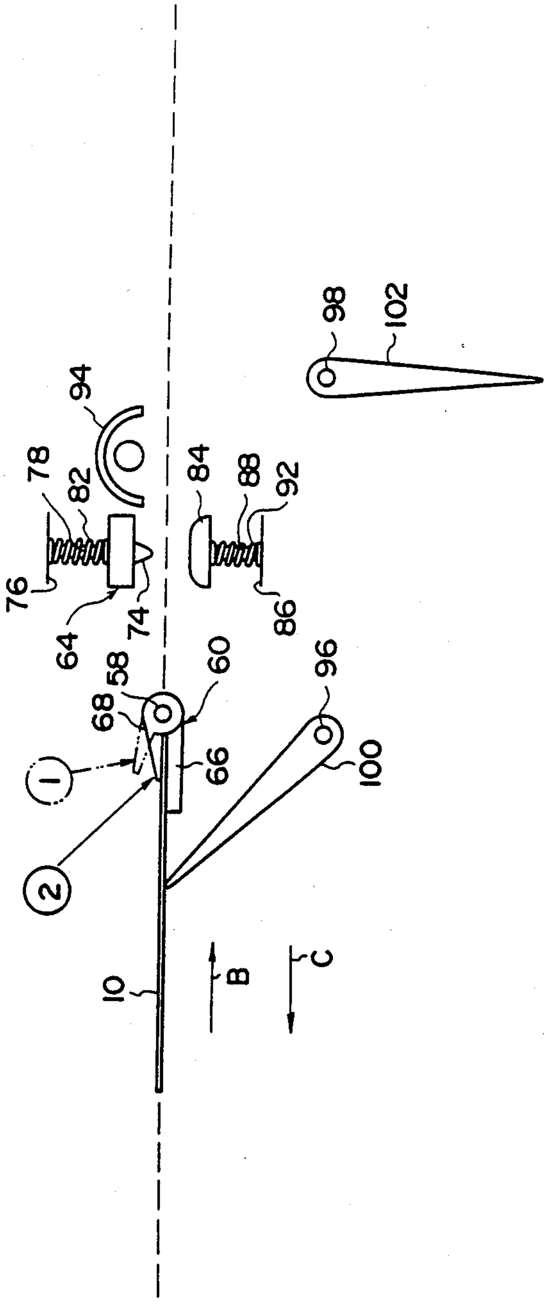
FIGS. 3(A) to 3(D) are charts which serve to illustrate the process of producing the color of the multi-color heat-sensitive recording material used in the first embodiment.
Figure 3:
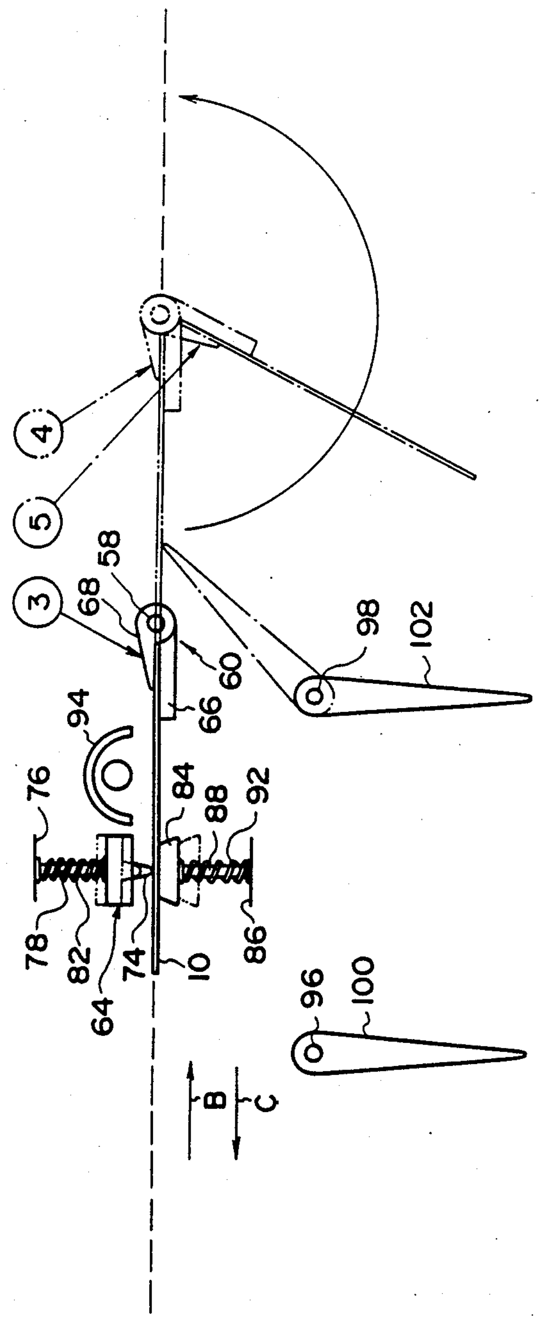
Figure 3:
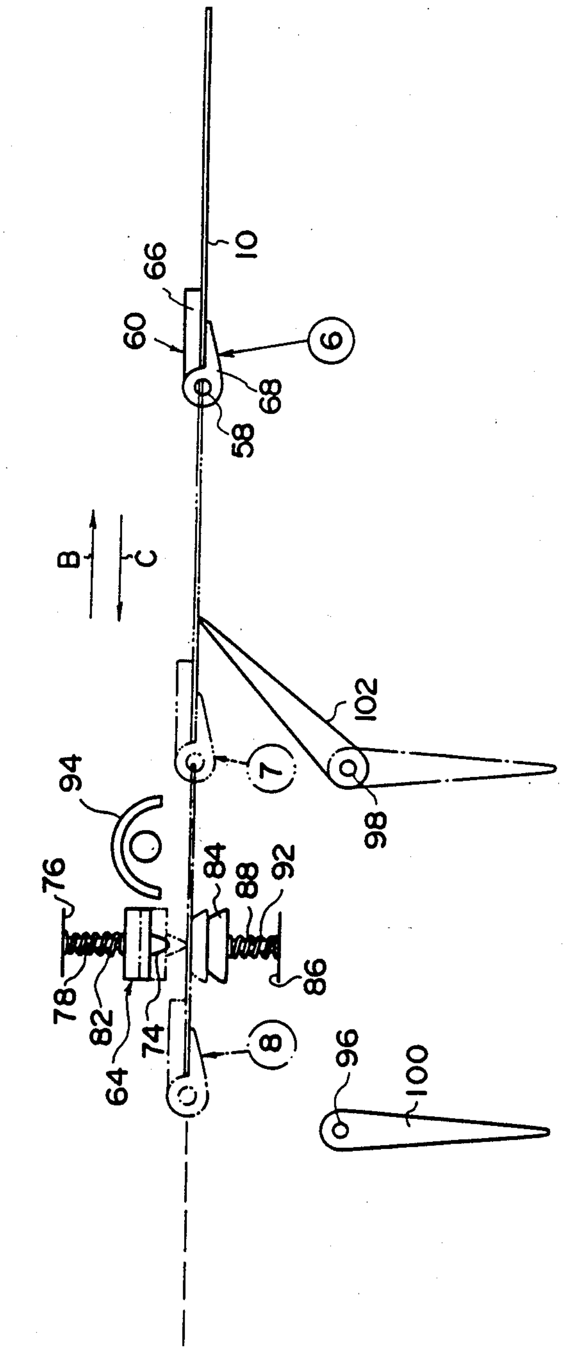
Figure 3:
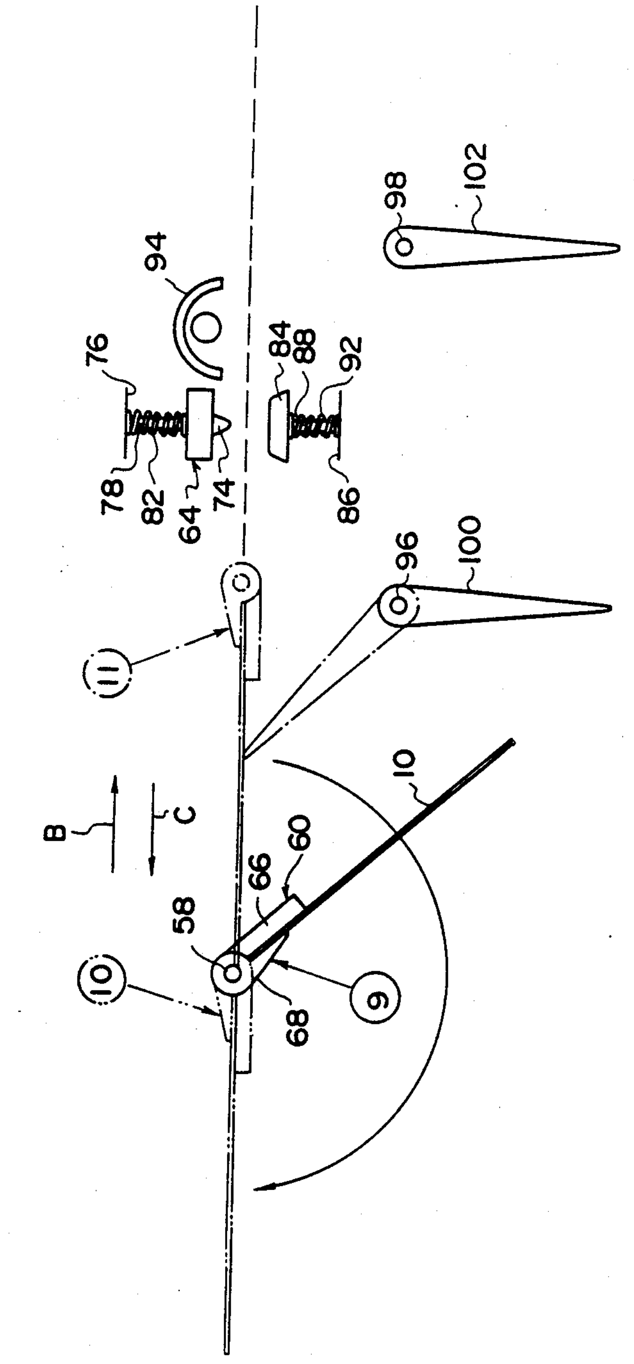
Figure 4:
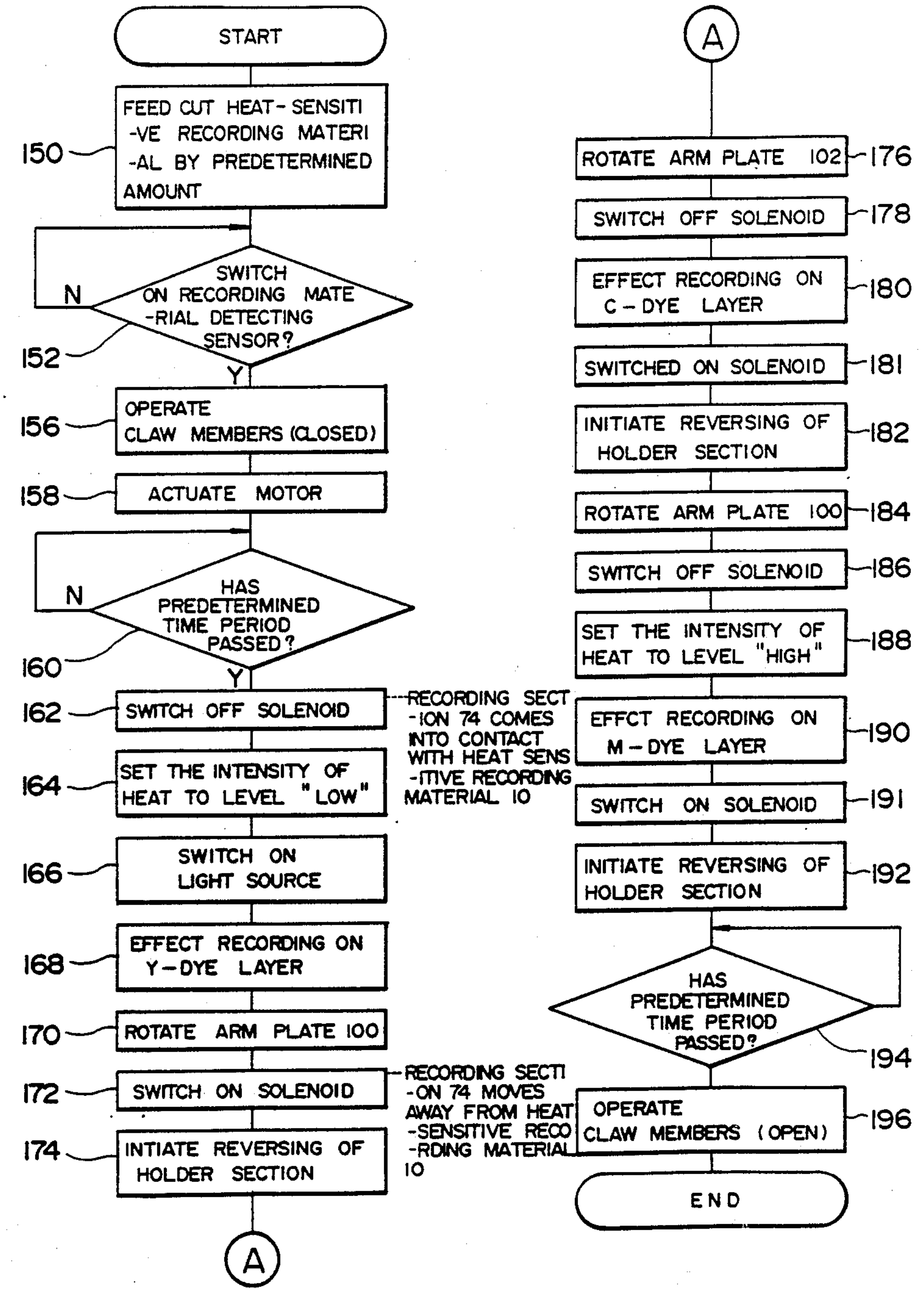
FIG. 4 is a control flow chart which serves to illustrate the operation of the first embodiment.

When the trailing edge of the heat-sensitive recording material 10 has passed the thermal head 64, the arm plate 100 is, in Step 170, caused to rotate in the counterclockwise direction to reach the position shown in FIG. 3(B). Then, in Step 172, the solenoids 76 and 86 are energized and the thermal head 64 and the guide plate 84 are caused to move away from each other (the state shown by phantom lines in FIG. 3(B)). Then, in Step 174, the reversing shaft 58 is rotated 180° in the counterclockwise direction, that is, from the state —⑤ shown by one-dot chain lines of FIG. 3(B) to the state —⑥ shown by solid lines of FIG. 3(C).

In this state, the position of the moving base 34 coincides with the position of the roller 48 and the moving shaft 44 is shifted from the upper end to the lower end of the slot 40 of the coupling plate 38 as the flat belt 42 rotates about the roller 48 in the direction of the arrow D of FIG. 2. Thus, the direction of movement of the moving base 34 is reversed Accordingly the heat-sensitive recording material 10 proceeds from the state —⑥ shown by the solid lines to the state —⑦ shown by two-dot chain lines of FIG. 3(C).

When the heat-sensitive recording material 10 enter the state (—⑦ shown by a two-dot chain line of FIG 3(C), the art plate 102 is, in Step 176, caused to rotate i the counterclockwise direction to support an intermediate portion of the heat-sensitive recording material 10

As the flat belt 42 is further driven, the heat-sensitiv recording material 10 is also moved further. When th heat-sensitive recording material 10 is set to the state—( shown by one-dot chain lines of FIG. 3(C), the energiz ing of the solenoids 76 and 86 is cancelled in Step 178 s that, in the manner described in connection with Ste 162, the thermal head 64 and the guide plate 84 ar caused to move toward each other so as to press agains the heat-sensitive recording material 10 from the oppo site sides thereof. Then, in Step 180, an image signal i supplied to the heat generating unit 74 and the heatin of the C-dye layer 130 is initiated. The image signa provided in this case is a signal which is reverse to th signal provided during the heating of the Y-dye laye 128. The heating of the C-dye layer 130 does not affec the M-dye layer 126 which is formed on the opposit side of the carrier (PET 125). Incidentally, when th recording of the C-dye layer 130 is completed, th solenioids 76 and 86 are energized in Step 181.

When the trailing edge of the heat-sensitive recordin material 10 has passed the thermal head 64 and th moving base 34 and reached the position of the rolle 46, the reversing shaft 58 is, in Step 182, caused to rotat in the clockwise direction (from the position —⑨ show by solid lines to the position —⑩ shown by two-dc chain lines in FIG. 3(D)). Simultaneously, the projec tion 56 of the flat belt 42 is reversed from down to to to cause the moving shaft 44 to shift from the lower en to the upper end of the slot 40 of the coupling plate 3ؘ thereby reversing the direction of movement of th moving base 34. When the heat-sensitive recordin material 10 is set to the state —⑪ shown by one-dc chain lines in FIG. 3(D), the arm plate 100 is, in Ste 184, caused to rotate in the clockwise direction to sup port an intermediate portion of the heat-sensitive re cording material 10.

Subsequently, when the heat-sensitive recording ma terial 10 is again set to the state —③ shown by the soli lines of FIG. 3(B), the supply of electricity to the sole noids 76 and 86 is cut off in Step 186. In Step 188, th intensity of heat to be generated by the heat generatin unit 74 is set to the level "HIGH". Then, in Step 190, a image signal is output and the heating of the M-dy layer 126 is effected. Since the Y-dye layer 128 whic overlies the M-dye layer 126 is fixed as described abov the hue of the Y-dye layer 128 does not undergo an variation.

After completion of the heating of the M-dye laye 126, the solenoids 76 and 86 are energized in Step 19 and the heat-sensitive recording material 10 is set in th state —④ shown by the two-dot chain lines of FIC 3(B). In this state, the reversing shaft 58 is rotated in th counterclockwise direction in Step 192 and, at an inte mediate position during the rotation through 180 de grees; that is, if it is determined in Step 194 that a prede termined time period has passed after the rotation of th reversing shaft 58 has started, the process proceeds t Step 196, in which case the claw members 68 are diser gaged from the heat-sensitive recording material 1( The heat-sensitive recording material 10 moves to th output tray 29 by virtue of its own weight and is di charged from the heating section 28 along the slope c the outlet tray 29. At the same time, the holder sectio 60 is transported to, and stopped at, the position –(1) shown in FIG. 3(A) with the claw members 68 separated from the base 66. This completes one cycle of image recording on a single heat-sensitive recording material 10.

As described above, and in accordance with the first embodiment, it is possible to automatically heat the coupler layers deposited on the opposite sides of the carrier and to obtain a color hard copy at high speeds and with ease.

In the first embodiment, the inlet side through which the heat-sensitive recording material 10 is passed into the heating section 28 is provided on the side opposite to the outlet side through which the heat-sensitive recording material 10 is discharged. However, the heat-sensitive recording material 10 may be discharged after having made two round trips. Although an intermediate portion of the heat-sensitive recording material 10 is supported on the arm plate 100 or 102, a roller means may be substituted for these arm plates for supporting purposes. Moreover, the reciprocal movement of the moving base 34 may be realized not by the flat belt 42 but by an air cylinder or the like which can accommodate a longer stroke of axial movement of each of the actuators.

In the first embodiment, during both the heating process and the reversing process, the moving base 38 is moved at a constant speed so as to effect each process step sequentially in accordance with a predetermined timing sequence. However, sensors may be provided at predetermined positions so that the moving base 38 are stepped in accordance with the output of each sensor.

Moreover, in the first embodiment, two coupler layers are deposited on one surface of the heat-sensitive recording material with one coupler layer deposited on the other surface. However, the first embodiment can be applied to a heat-sensitive recording material of the type having opposite surfaces each coated with one coupler layer.

Although the first embodiment is arranged so that the heat-sensitive recording material 10 is held on the base 66 by the claw members 68, a plurality of through holes may be formed in the portion of the base 66 on which the heat-sensitive recording material 10 is to be carried, so as to hold it by suction.

Figure 5:
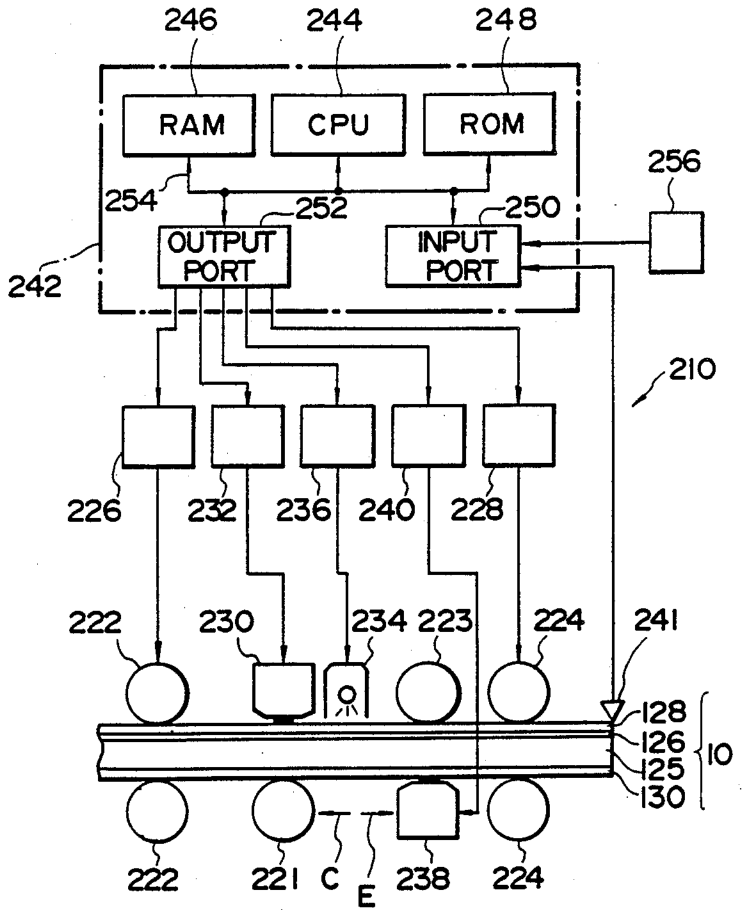
FIG. 5 is a block diagram diagrammatically showing the construction of a second embodiment of an image recording apparatus according to the present invention.

FIG. 5 diagrammatically shows the construction of an image recording apparatus 210 according to a second embodiment of the present invention.

Since a heat-sensitive recording material 10 has the same construction as the one used in the first embodiment, the description is omitted.

The image recording apparatus 210 includes feed rollers 222 and 224 which constitute a feeding means capable of feeding the heat-sensitive recording material 10 back and forth in the directions indicated by arrows E and F in FIG. 5. These feed rollers 222 and 224 are connected to a control circuit 242 through drivers 226 and 228 which will be described later, respectively.

As illustrated, guide rollers 223 and 221 are respectively disposed in opposition to the upper and lower surfaces of the heat-sensitive recording material 10 along the feed path for the heat-sensitive recording material 10, so as to guide the heat-sensitive recording material 10.

A thermal head 230 which serves as a first recording head is disposed in opposition to the top of the guide roller 221 so as to allow the heat-sensitive recording material 10 move through the gap between the thermal head 230 and the guide roller 221. The thermal head 230 therefore opposes the Y-dye layer 128 and the M-dye layer 126 of the heat-sensitive recording material 10 so that it can generate heat to develop the color of the M-dye layer 126 or the Y-dye layer 128. This thermal head 230 is connected to the control circuit 242 through a driver 232 and is arranged to operate in accordance with an image signal.

A light illuminator 234 which serves as light fixing means is disposed in the vicinity of the thermal head 230. The light illuminator 234 is arranged to irradiate the upper surface of the heat-sensitive recording material 10 with light rays of wavelength 400 nm. This fixes the color of the Y-dye layer 128 which is produced by the thermal head 230. The light illuminator 234 is also connected to the control circuit 242 through a driver 236.

A thermal head 238 which serves as a second recording head is disposed in opposition to the bottom of the guide roller 223 so as to allow the heat-sensitive recording material 10 to move through the gap between the thermal head 238 and the guide roller 223. The thermal head 238 therefore opposes the C-dye layer 130 of the heat-sensitive recording material 10 so that it can generate heat to develop the color of the C-dye layer 130. This thermal head 238 is also connected to the control circuit 242 through a driver 240 and is arranged to operate in accordance with an image signal.

A sensor 241 is disposed on one side of the feed roller 224 so as to detect the leading edge of the heat-sensitive recording material 10 which is fed by the feed rollers 222 and 224. The sensor 241 is also connected to the control circuit 242.

The control circuit 242 consists of a CPU 244, a RAM 246, a ROM 248, an input port 250, an output port 252, and a bus 254 including a data bus and a control bus for connecting these elements.

The above sensor 241 is connected to the input port 250 so that a position detection signal from the sensor 241 is input to the input port 250. A start switch 256 is also connected to the input port 250. When the start switch 256 is actuated, a sequence of image recording processes is initiated.

The output port 252 is connected to drivers 226, 228, 236, 232 and 240 which are in turn connected to the feed rollers 222, 224, the light illuminator 234 and the thermal heads 230, 238, respectively. Thus, each of the drivers is controlled by the control circuit 242.

Figure 6:
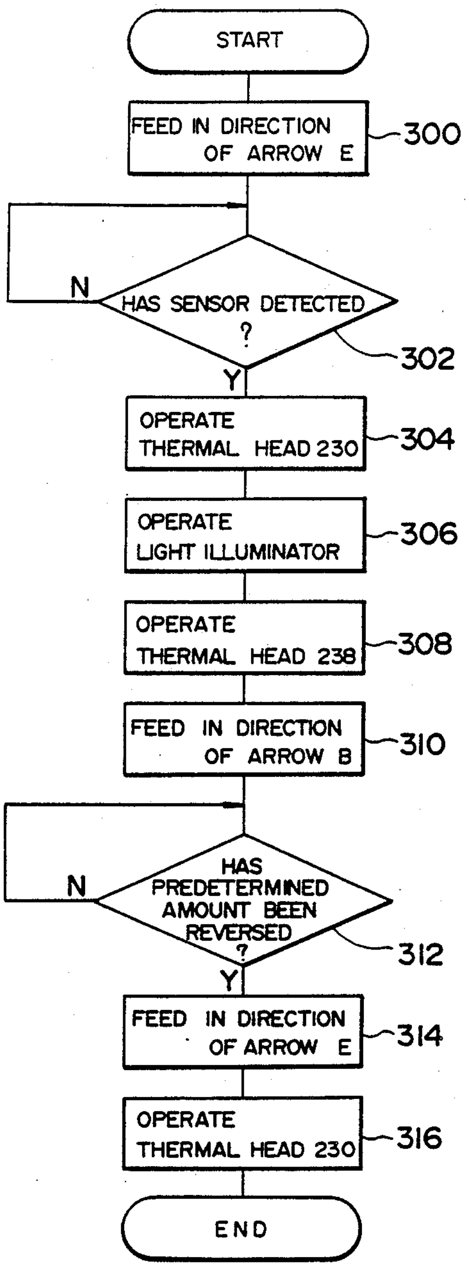
FIG. 6 is a control flow chart which serves to illustrate the operation of the second embodiment.

The operation of the second embodiment will now be described below with reference to the control flow chart shown in FIG. 6.

When the start switch 256 is actuated, in Step 330, the feed rollers 222 and 224 are operated to feed the heat-sensitive recording material 10 in the direction of arrow E of FIG. 5. Then, in Step 302, it is determined whether or not the sensor 241 has detected the leading end of that heat-sensitive recording material 10, that is, whether or not the leading end has reached a predetermined image recording position.

When it is determined that the leading end of the heat-sensitive recording material 10 has reached the predetermined image recording position, the process proceeds to Step 304, in which case the thermal head 230 is actuated to initiate a first cycle of image recording. The intensity of heat to be generated by the thermal head 230 is set to the level "LOW" so as to heat the heat-sensitive recording material 10 in accordance with an image signal, thereby producing the color of the Y-dye layer 128 alone. In Step 306, the light illuminator 234 is actuated to irradiate the heat-sensitive recording material 10 with light rays of wavelength 400 nm. This step serves to fix the Y-dye layer 128, thereby preventing any variation in the hue of the Y-dye layer 128 during the subsequent heating.

In Step 308, the thermal head 238 is actuated to heat the C-dye layer 130 deposited on the underside of the heat-sensitive recording material 10 in accordance with an image signal. This develops the color of this C-dye layer 130.

After the heating of the Y-dye layer 128 and the C-dye layer 130 has been completed, the process proceeds to Step 310, where the heat-sensitive recording material 10 is reversed in the direction of arrow F of FIG. 5. Then, in Step 312, it is determined whether or not the sensor 241 has detected the leading edge of the heat-sensitive recording material 10, that is, whether or not that leading end has returned to the initial image-recording start position.

When it is determined that the leading end of the heat-sensitive recording material 10 has reached the initial image-recording start position, the process proceeds to Step 314, in which case the heat-sensitive recording material 10 is fed again in the direction of arrow E of FIG. 1. Then, in Step 316, the thermal head 230 is again actuated to initiate a second cycle of image recording. The intensity of heat to be generated by the thermal head 230 is set to the level "HIGH" in order to heat the heat-sensitive recording material 10 in accordance with an image signal. This develops the color of the M-dye layer 126. In this case, since the overlying Y-dye layer 128 is fixed so as not to undergo any variation in hue by heating, the hue of this layer does not change and the M-dye layer 126 alone independently produces color.

The "LOW" intensity of heat mentioned above corresponds to, for example, the heat energy of 0.2–1.5 mJ/dot, while the level "HIGH" corresponds to the heat energy 1.5–2 times as large as that applied when the level "LOW" is selected. However, the intensity of heat is not limited solely to this example. Heat may be applied at the intensity inherent in each coupler layer carried by the heat-sensitive recording material 10.

When the heating of the M-dye layer 126 has been completed, all the image recording processes are ended, thus providing a color image.

As described above, since it is possible to heat each coupler layer of the heat-sensitive recording material 10 without reversing it, an image recording apparatus of simplified structure can be provided. Furthermore, the images of the respective coupler layers are not offset. Since the Y-dye layer 128 is fixed by means of the light illuminator 234, it is possible to independently produce the colors of the respective coupler layers and, therfore, obtain a color image of improved quality.

As described above, the second embodiment is arranged so that the colors of the Y-dye layer 128 and the C-dye layer 130 can be produced by heating the opposite surfaces of the heat-sensitive recording material 10 during the first cycle of image recording. That is, one complete cycle of image recording can be effected while the heat-sensitive recording material 10 is making one round trip (or one and a half trips). However, the present invention is not limited solely to such an arrangement. For example, it is also possible to adopt an arrangement where the Y-dye layer 128, the M-dye layer 126 and the C-dye layer 130 are independently colored while the heat-sensitive recording material 10 is making two round trips (or two and a half round trips), that is, by repeating heating three times.

In the second embodiment, two coupler layers are deposited on one surface of the heat-sensitive recording material 10 with one coupler layer deposited on the other surface. However, the second embodiment can be applied to a heat-sensitive recording material of the type having opposite surfaces each coated with one coupler layer.

Moreover, in the second embodiment, the rollers 221 and 223 are disposed in opposition to the recording heads 230 and 238, respectively. However, these rollers may be replaced with guide plates.

Figure 7:
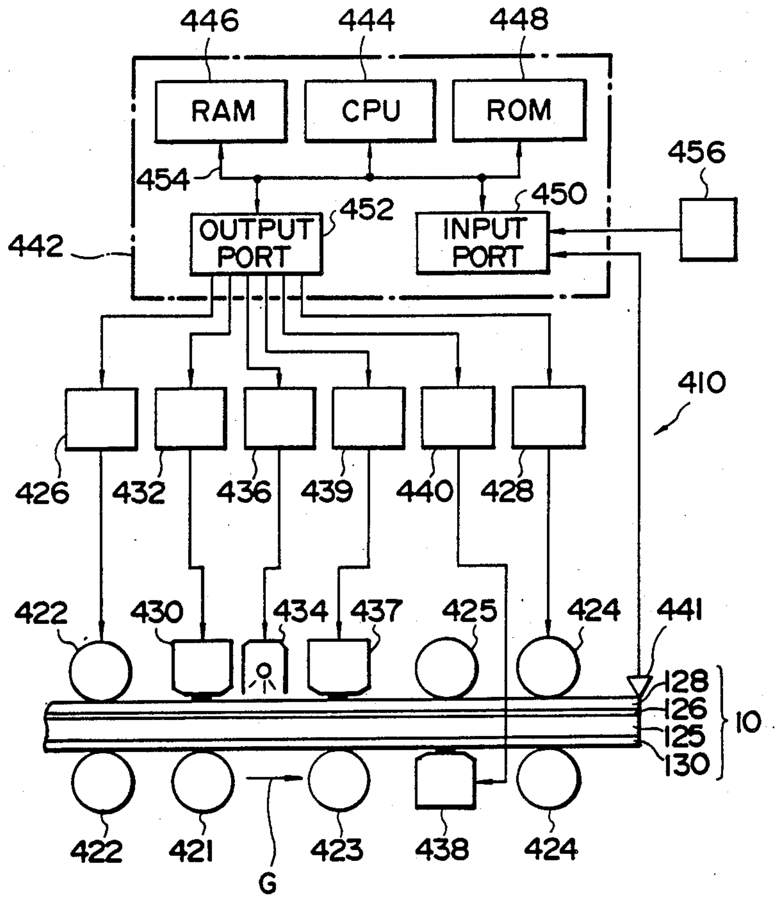
FIG. 7 is a block diagram diagrammatically showing the construction of a third embodiment of an image recording apparatus according to the present invention.

FIG. 7 diagrammatically shows the construction of an image recording apparatus 410 according to a third embodiment of the present invention.

The image recording apparatus 410 includes feed rollers 422 and 424 which constitute a feeding means capable of feeding a heat-sensitive recording material 10 in the direction indicated by arrow G in FIG. 7. These feed rollers 422 and 424 are connected to a control circuit 442 through drivers 426 and 428 which will be described later, respectively.

As illustrated, guide rollers 421, 423 and 425 are disposed along the feed path of the heat-sensitive recording material 10 so as to guide the heat-sensitive recording material 10. The guide rollers 421 and 423 oppose the lower surface of the heat-sensitive recording material 10 with the guide roller 425 opposing the upper surface of the same.

A thermal head 430 which serves as a recording head is disposed in opposition to the top of the guide roller 421 so as to allow the heat-sensitive recording material 10 to move through the gap between the thermal head 430 and the guide roller 421. The thermal head 430 therefore opposes the Y-dye layer 128 and the M-dye layer 126 of the heat-sensitive recording material 10. The level of the heat energy of the thermal head 430 is set to the level "LOW" so that the color of the Y-dye layer 128 alone can be produced. This thermal head 430 is connected to the control circuit 442 by a driver 432 and is arranged to operate in accordance with an image signal.

A light illuminator 434 which serves as light fixing means is disposed in the vicinity of the thermal head 430. The light illuminator 434 is arranged to irradiate the upper surface of the heat-sensitive recording material 10 with light rays of wavelength 400 nm, thereby fixing the color of the Y-dye layer 128 which is developed by the thermal head 430. The light illuminator 434 is also connected to the control circuit 442 through a driver 436.

A thermal head 437 which serves as a recording head is disposed in opposition to the top of the guide roller 423 so as to allow the heat sensitive recording material 10 to move through the gap between the thermal head 437 and the guide roller 423. The thermal head 437 therefore opposes the Y-dye layer 128 and the M-dye layer 126 of the heat-sensitive recording material 10. The level of heat energy of the thermal head 437 is set to the level "HIGH", whereby the heat energy of the thermal head 437 acts upon both the Y-dye layer 128 and the M-dye layer 126. However, since the Y-dye layer 128 is fixed by irradiation from the light illuminator 434, the color of the M-dye layer 126 alone is developed.

The intensity of heat "LOW" mentioned above corresponds to, for example, the heat energy of 0.2–1.5 mJ/dot, while the level "HIGH" corresponds to the heat energy 1.5 to 2 times as large as that applied when the level "LOW" is selected. However, the intensity of heat is not limited solely to this example. Heat may be applied at the intensity inherent in each coupler layer carried by the heat-sensitive recording material 10.

The thermal head 437 is also connected to the control circuit 442 through a driver 439 and is arranged to operate in accordance with an image signal.

A thermal head 438 which serves as a recording head is disposed in opposition to the bottom of the guide roller 425 so as to allow the heat-sensitive recording material 10 to move through the gap between the thermal head 438 and the guide roller 425. The thermal head 438 therefore opposes the C-dye layer 130 of the heat-sensitive recording material 10 so that it can generate heat to develop the color of the C-dye layer 130. This thermal head 438 is also connected to the control circuit 442 by a driver 440 and is arranged to operate in accordance with an image signal.

A sensor 441 is disposed on one side of the feed roller 424 so as to detect the leading edge of the heat-sensitive recording material 10 which is fed by the feed rollers 422 and 424. The sensor 441 is also connected to the control circuit 442.

The control circuit 442 consists of a CPU 444, a RAM 446, a RAM 448, an input port 450, an output port 452, and a bus 454 including a data bus and a control bus for connecting these elements.

The above sensor 441 is connected to the input port 450 so that a position detection signal from the sensor 441 is input to the input port 450. A start switch 456 is also connected to the input port 450. When the start switch 456 is actuated, a sequence of image recording processes is initiated.

The output port 452 is connected to drivers 426, 428, 436, 432, 439 and 440 which are in turn connected to the feed rollers 422, 424, the light illuminator 434; and the thermal heads 430, 437, 438, respectively. Thus, each of the drivers are controlled by the control circuit 442.

Figure 8:
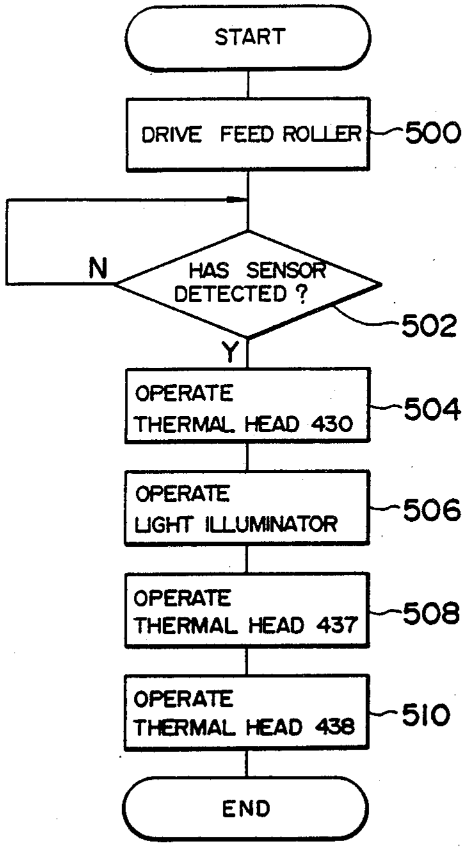
FIG. 8 is a control flow chart which serves to illustrate the operation of the third embodiment.

The operation of the third embodiment will now be described below with reference to the control flow chart shown in FIG. 8.

When the start switch 456 is actuated, in Step 500, the feed rollers 422 and 424 are operated to feed the heat-sensitive recording material 10 in the direction of arrow G of FIG. 7. Then, in Step 502, it is determined whether or not the sensor 441 has detected the leading end of the heat-sensitive recording material 10. That is, whether or not the leading end has reached a predetermined image recording position.

When it is determined that the leading end of the heat-sensitive recording material 10 has reached the predetermined image recording position, the process proceeds to Step 504, in which case the thermal head 430 is actuated to initiate recording of a Y-color image. The intensity of heat to be generated by the thermal head 430 is set to the level "LOW" so as to heat the upper surface of the heat-sensitive recording material 10 in accordance with an image signal, thereby producing the color of the Y-dye layer 128 alone. In Step 506, the light illuminator 434 is actuated to irradiate the heat-sensitive recording material 10 with light rays of wavelength 400 nm. This step serves to fix the Y-dye layer 128, thereby preventing any variation in the hue of the Y-dye layer 128 during subsequent heating.

Moreover, in Step 508, the thermal head 437 is actuated to initiate recording of an M-color image. The intensity of heat to be generated by the thermal head 437 is set to the level "HIGH" so as to heat the M-dye layer 126 underlying the Y-dye layer 128 in accordance with an image signal. This develops the color of the M-dye layer 126. In this case, since the overlying Y-dye layer 128 is fixed so as not to undergo any variation in hue by heating, the hue of this layer does not change and the M-dye layer 126 alone independently produces color. In this case, since the thermal head 437 operates in synchronization with the feed of the heat-sensitive recording material 10, the coloring of the M-dye layer 126 is effected in correspondence with picture elements which are the same as the picture elements contained in the Y-dye layer 128 that was colored by the thermal heads 430.

After the heating of the Y-dye layer 128 and the M-dye layer 126 has been completed, the process proceeds to Step 510, where the thermal head 438 is actuated to initiate recording of a C-color image. The thermal head 438 opposes the C-color layer 130 deposited on the lower side of the heat-sensitive recording material 10, and is arranged to heat the heat-sensitive recording material 10 in accordance with an image signal. This develops the color of the C-dye layer 130. In this case, since the thermal head 438 operates in synchronization with the feed of the heat-sensitive recording material 10, the coloring of the C-dye layer 139 is effected in correspondence with picture elements which are the same as the picture elements contained in the M-dye layer 126 and the Y-dye layer 128 which were colored by the thermal heads 430 and 437, respectively.

When the heating of the C-dye layer 130 has been completed, all the image recording steps are ended, thus providing a color image.

As described above, since it is possible to heat each coupler layer of the heat-sensitive recording material 10 without reversing it and during the feeding thereof in one direction, an image recording apparatus of simplified structure can be provided. Furthermore, the images of the respective coupler layers are not offset.

Since the Y-dye layer 128 is fixed by means of the light illuminator 434, it is possible to independently produce the colors of the respective deposited color coupler layers and, therefore, obtain a color image of improved quality.

Moreover, it is sufficient that the heat energy of each thermal head is set to a fixed value which corresponds to the energy level required to produce the color of each of the Y-dye layer, the M-dye layer and the C-dye layer. Accordingly, it is not necessary to render the heat energy of each thermal head variable. Control of the variable heat energy is threfor omitted. Thus, it is possible to provide an image recording apparatus of simplified structure and to reduce the cost of the apparatus.

Figure 9:
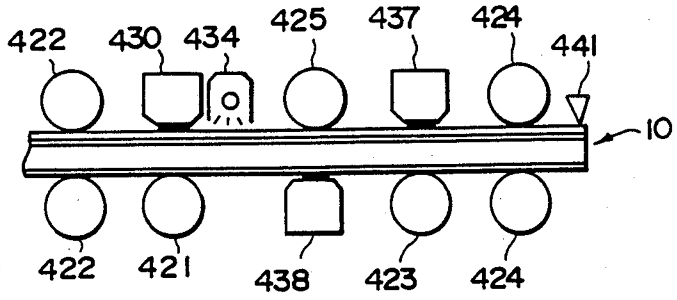
FIG. 9 is a block diagram diagrammatically showing the construction of a yet another embodiment of an image recording apparatus according to the present invention.

Although the third embodiment has the arrangement in which the thermal head 437 is disposed between the thermal heads 432 and 438, this arrangement is not a limited one. For example, as shown in FIG. 9, the thermal head 437 may be disposed downstream from the thermal head 438 so that the M-dye layer 126 can be heated after heating the C-dye layer 130.

In the third embodiment as well, two coupler layers are deposited on one surface of the heat-sensitive recording material 10 with one coupler layer deposited on the other surface. However, the third embodiment can also be applied to a heat-sensitive recording material of the type having opposite surfaces each coated with one coupler layer.

Figure 10:
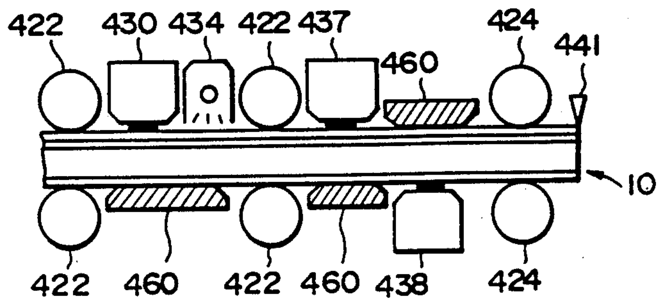
FIG. 10 is a block diagram diagrammatically showing the construction of still another embodiment of an image recording apparatus according to the present invention.

Moreover, in the third embodiment, the rollers are disposed in opposition to the respective recording heads, but, as shown in FIG. 10, a flat guide plate of small frictional coefficiency may be disposed in opposition to each of the recording heads.

It is to be noted that in the above embodiments the heat-sensitive recording material has the structure in which one surface of a carrier is coated with the Y-dye layer and the M-dye layer and the other surface thereof is coated with the C-dye layer. However, the present invention is not limited to the above embodiments.

That is to say, in this invention each of the Y-dye, M-dye and C-dye layers may be coated on any one of both the surfaces of the carrier.

Furthermore, the present invention can be applied to the heat-sensitive recording material having the structure in which one surface of the carrier is coated with two layers, for example, the Y-dye layer and the M-dye layer, while the other surface thereof is also coated with two layer, for example, the C-dye layer and a black-dye layer.

In case that the heat-sensitive recording material having the above four layers is used, the colors of the outer layers of both the surfaces of the carrier is developed and the outer layers developed are independently or simultaneously fixed by irradiation with light rays. Thereafter, the color of the inner layer of one surface of the carrier is developed and the color of the inner layer of the other surface thereof is also developed. Thus, the four colors of the Y-dye, M-dye, C-dye and black-dye layers are all developed.

What is claimed is:

1. An image recording apparatus for recording an image on a heat-sensitive recording material composed of a transparent carrier and transparent heat-sensitive coupler layers formed on the opposite surfaces of said transparent carrier, respectively, and capable of producing colors each having a different hue, a plurality of transparent heat-sensitive coupler layers being deposited on at least one of said opposite surfaces, comprising:

feeding means for feeding said heat-sensitive recording material rectilinearlily;

a recording head means for developing by heating, the colors of said respective transparent heat-sensitive coupler layers of said heat-sensitive recording material fed by said feeding means;

light fixing means for fixing, by irradiation with light rays, the outermost transparent heat-sensitive coupler layer that produced its color from among said plurality of transparent heat-sensitive coupler layers; and light fixing means for fixing, by irradiation with light rays, the outermost transparent heat-sensitive coupler layer that produced its color from among said plurality of transparent heat-sensitive coupler layers; and controller means for coordinating the operation of said feeding means, reading head means and light fixing means in order to permit recording of multicolor images on said material.

2. An image recording apparatus for recording an image on a heat-sensitive recording material composed of a transparent carrier and transparent heat-sensitive coupler layers formed on the opposite surfaces of said transparent carrier, respectively, and capable of producing colors each having a different hue, a plurality of transparent heat-sensitive coupler layers being deposited on at least one of said opposite surfaces comprising:

feeding means for feeding said heat-sensitive recording material rectilinearlily;

recording head means for developing by heating, the colors of said respective transparent heat-sensitive coupler layers of said heat-sensitive recording material fed by said feeding means;

light fixing means for fixing, by irradiation with light rays, the outermost transparent heat-sensitive coupler layer that produced its color from among said plurality of transparent heat-sensitive coupler layers;

controller means for coordinating the operation of said feeding means, recording head means and light fixing means in order to permit recording of a multi-color image on said material; and reversing means for reversing the direction of feed of said heat-sensitive recording material and simultaneously for turning said heat-sensitive recording material upside down.

3. An image recording apparatus according to claim 2, wherein said feeding means includes a holder section for holding the leading end of said heat-sensitive recording material in the direction of the feed thereof.

4. An image recording apparatus according to claim 3, wherein said reversing means includes rotating means for rotating said holder section through 180 degrees.

5. An image recording apparatus according to claim 3, wherein said recording head is disposed in opposition to one of said opposite surfaces of said heat-sensitive recording material which is being fed.

6. An image recording apparatus according to claim 1, wherein said recording head means is disposed in opposition to each of said opposite surfaces of said heat-sensitive recording material which is being fed.

7. An image recording apparatus according to claim 6, wherein said recording head means comprises a plurality of recording heads opposing said plurality of transparent heat-sensitive coupler layers and being disposed along the direction of the feed of said heat-sensitive recording material, the number of said recording heads being the same as the number of said transparent heat-sensitive coupler layers.

8. An image recording apparatus according to claim 7, wherein said light fixing means is disposed between said recording heads disposed in opposition to said plurality of transparent heat-sensitive coupler layers.

9. An image recording apparatus according to claim 1, further comprising guide means for guiding said heat-sensitive recording material to be fed to a position opposing said recording head means.

10. An image recording apparatus for recording an image on a heat-sensitive recording material having a first transparent heat-sensitive coupler layer applied to one surface of a sheet like transparent carrier, a second transparent heat-sensitive coupler layer applied to said first transparent heat-sensitive coupler layer, and a third transparent heat-sensitive coupler layer applied to the other surface of said transparent carrier, comprising:

feeding means for feeding said heat-sensitive recording material along a rectilinear feeding path;

a plurality of recording heads disposed along the feeding path of said heat-sensitive recording material and operative to develop, by heating, the colors of said respective first to third transparent heat-sensitive coupler layers;

a light fixing means for fixing, by irradiation with predetermined light rays, the one which developed its color earlier between said first and second transparent heat-sensitive coupler layers; and controller means for coordinating the operation of said feeding means, plural recording heads and light fixing means in order to permit recording of a multi-color image on said material.

11. An image recording apparatus for recording an image on a heat-sensitive recording material having a first transparent heat-sensitive coupler layer applied to one surface of a sheet like transparent carrier, a second transparent heat-sensitive coupler layer applied to said first transparent heat-sensitive coupler layer, and a third transparent heat-sensitive coupler layer applied to the other surface of said transparent carrier, comprising:

feeding means for feeding said heat-sensitive recording material along a rectilinear feeding path;

recording head means disposed along the feeding path of said heat-sensitive recording material and operative to develop, by heating, the colors of said respective first to third transparent heat-sensitive coupler layers;

a light fixing means for fixing, by irradiation with predetermined light rays, the one which developed its color earlier between said first and second transparent heat-sensitive coupler layers;

controller means for coordinating the operation of said feeding means, plural recording heads and light fixing means in order to permit recording of a multi color image on said material; and reversing means operative to turn said heat-sensitive recording material upside down, said feeding means being arranged to feed said heat-sensitive recording material in a first direction and in a second direction opposite to said first direction.

12. An image recording apparatus according to claim 11, wherein said recording head means comprises at least one recording head, said recording head and said light fixing means opposing said one surface of said recording material which is being fed in said first direction, said recording head and said light fixing means being arranged in that order in said first direction, said image recording apparatus further comprising a control means for firstly operating said recording head to produce the color of said second transparent heat-sensitive coupler layer during a first operation of feeding said heat-sensitive recording material in said first direction; secondly operating said light fixing means to fix second transparent heat-sensitive coupler layer whose color has been developed thirdly operating said reversing means to turn said heat-sensitive recording material upside down; fourthly operating said recording head to develop the color of said third transparent heat-sensitive coupler layer while said heat-sensitive recording material is being fed in said second direction; then operating said reversing means to turn said heat sensitive recording material upside down; and subsequently operating said recording head to develop the color of said first transparent heat-sensitive recording material during a second operation of feeding said first transparent heat-sensitive coupler layer in said first direction.

13. An image recording apparatus according to claim 10, wherein said recording heads are disposed in opposition to each of opposite surfaces of said heat-sensitive recording material which is being fed, said light fixing means being disposed in opposition to one surface of said heat-sensitive recording material and downstream from one of said recording heads opposing said one surface, said image recording apparatus further comprising control means for firstly operating said recording head opposing said one surface to develop the color of said second transparent head-sensitive coupler layer during a first operation of feeding said heat-sensitive recording material; secondly operating said light fixing means to fix said second transparent heat-sensitive coupler layer whose color has been developed; thirdly operating said recording head opposing the other surface of said heat-sensitive recording material to develop the color of said third transparent heat-sensitive coupler layer; and fourthly operation said recording head opposing said one surface to produce the color of said first transparent heat-sensitive coupler layer during a second operation of feeding said heat-sensitive recording material.

14. An image recording apparatus according to claim 10, wherein two recording heads are disposed in opposition to said one surface of said heat-sensitive recording material which is being fed with one recording head disposed in opposition to said other surface of said heat-sensitive recording material, said light fixing means being disposed between said two recording heads disposed in opposition to said one surface, said image recording apparatus further comprising control means for operating an upstream recording head, in the direction of feeding, of said recording heads opposing said one surface to develop the color of said second transparent heat-sensitive coupler layer during the feeding of said heat-sensitive recording material; then operating said light fixing means to fix said second transparent heat-sensitive coupler layer whose color has been developed and subsequently operating the downstream recording head, in the direction of feeding, of said recording heads opposing said one surface to develop the color of said first transparent heat-sensitive coupler layer and, at the same time, operating said recording head opposing said other surface to develop the color of said third transparent heat-sensitive coupler layer.

15. An image recording apparatus according to claim 10, further comprising guide means for guiding said heat-sensitive recording material to be fed to the positions opposing said respective recording heads.

16. An image recording apparatus according to claim 15, wherein said guide means are rollers.

17. An image recording apparatus according to claim 15, wherein said guide means are plate members.

18. An image recording apparatus according to claim 10, wherein said feeding means is provided with a holder section for holding the leading end of said heat-sensitive recording material in the direction of the feed thereof.

19. An image recording apparatus according to claim 18, wherein said holder section is so constructed as to hold said leading end.

* * * * *